(No Model.)
F. WHITE.
BICYCLE TIRE.
No. 508,456.  Patented Nov. 14, 1893.
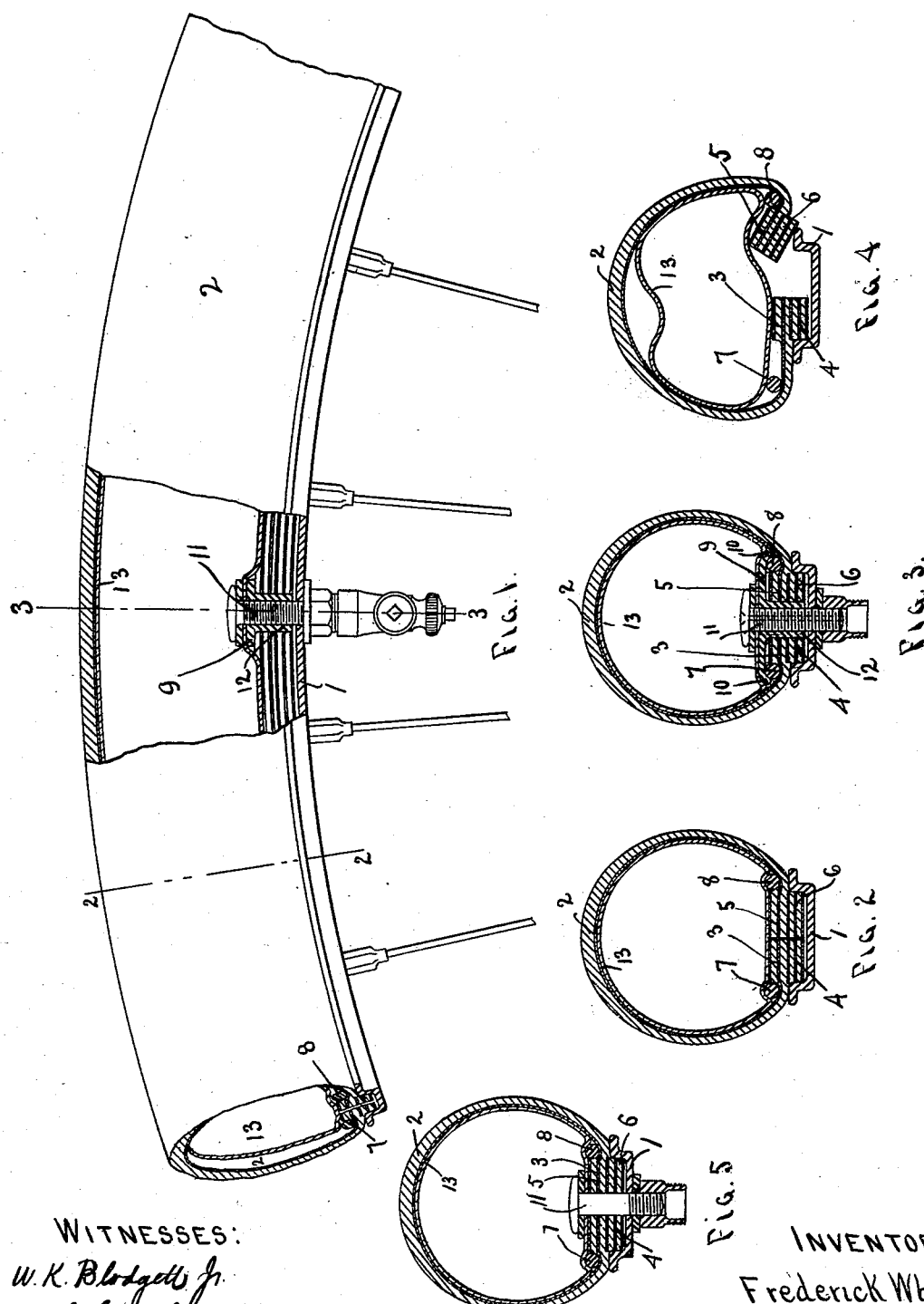
WITNESSES:
W. K. Blodgett Jr.
F. L. Goodhue.
INVENTOR:
Frederick White
by his attorney
Edward S. Beach

UNITED STATES PATENT OFFICE.

FREDERICK WHITE, OF BOSTON, MASSACHUSETTS, ASSIGNOR TO EDWARD S. BEACH, TRUSTEE, OF SAME PLACE.

BICYCLE-TIRE.

SPECIFICATION forming part of Letters Patent No. 508,456, dated November 14, 1893.

Application filed April 24, 1893. Serial No. 471,705. (No model.)

*To all whom it may concern:*

Be it known that I, FREDERICK WHITE, of Boston, in the county of Suffolk and State of Massachusetts, have invented a new and useful Improvement in Bicycle and other Tires, of which the following is a specification, reference being had to the accompanying drawings, in which—

Figure 1 is a side view of a portion of a rim and tire embodying my invention, a part being broken away for greater clearness. Fig. 2 is a cross-sectional view on line 2—2 of Fig. 1, and Fig. 3 is a partial cross-sectional view at line 3—3 of Fig. 1. Fig. 4 is a cross-sectional view illustrating positions of different elements of my new tire while the same is being put in place on the rim. Fig. 5 shows a modification.

The object of my invention is to produce a tire combining proper strength with extreme lightness, and my invention consists mainly in the combination of a troughed rim with a split sheath having a shoulder along each of its four margins, a pair of hoops, a clamp engaging the hoops and an inflatable tube, all as more specifically set forth below.

In the drawings, 1 is the troughed rim, and 2 the split sheath which is formed with marginal shoulders 3, 4, 5 and 6, shoulders 3 and 5 being on the inner margins, and shoulders 4 and 6 on the outer margins of sheath 2.

7 and 8 are hoops preferably of a fine quality of steel.

9 is a transverse clamp formed with shoulders 10.

11 is one form of valve stem projecting into the inflatable tube. When these parts are assembled, the outer marginal shoulders 4 and 6 of sheath 2 engage the sides and bottom of rim 1, the hoops 7 and 8 clamping the edges of sheath 2 against the rim and resting in the angles formed by the inner shoulders 3 and 5 respectively with the adjacent inner surface of the sheath. The shoulders or fingers 10, 10 of the clamp 9 engage the hoops and bind them in their resting places, the shoulders 3 and 5 serving as abutments to prevent closer lateral approach of the hoops. The clamp 9 is preferably held in place by the head of valve stem 11, which receives a nut which bears against the inner periphery of rim 1. Ordinarily I use but one clamp 9, but in case a plurality of clamps 9 is desired, ordinary bolts and nuts may be used to retain them in place. The clamp 9, shown, is formed with a tubular projection 12, which is between the opposed edges of the sheath but does not bottom on the rim. The use of such a form of clamp prevents all possibility of the sheath's creeping, but is not absolutely necessary to this end.

In Fig. 4, I illustrate the parts in process of assemblage, the hoops being crowded into place by exterior pressure on the sheath after the shoulders are located in the troughed rim. By this construction, an exceedingly strong and light tire is produced, the sheath of which is readily removed and replaced for repairing the air-tube.

In Fig. 5, the clamp 9 is dispensed with and the sheath held in place by the hoops 7 and 8.

What I claim is—

1. In a tire, the herein described combination of a troughed rim, a sheath, an inner inflatable tube, a pair of interior hoops, a transverse clamp and means for holding it in place, the sheath being formed with shoulders along each margin, the outer shoulders engaging the rim, the inner shoulders being engaged by the hoops, and the transverse clamp holding the hoops against the inner shoulders, all substantially as and for the purpose set forth.

2. In a tire, the combination of a troughed rim, a sheath and interior expansible tube with a pair of hoops intermediate the sheath and expansible tube, the sheath being provided with a shoulder along each margin, the outer shoulders lying in the rim, and the inner shoulders forming abutments to prevent the hoops moving laterally, all substantially as and for the purpose set forth.

3. In a tire, the combination of a troughed rim and a split sheath with a pair of hoops, the sheath being formed with outer marginal shoulders engaging the flanges of the rim, and with inner marginal shoulders forming abutments for the hoops, all substantially as and for the purpose set forth.

FREDERICK WHITE.

Witnesses:
EDWARD S. BEACH,
CHAS. E. BOWERS.